(12) United States Patent
Rischmueller

(10) Patent No.: US 7,738,834 B2
(45) Date of Patent: Jun. 15, 2010

(54) METHOD AND SYSTEM FOR PROVIDING BROADCAST CAPTIONS

(76) Inventor: Guy Rischmueller, 18 Roxby Street, Manifold Heights (AU) 3220

( * ) Notice: Subject to any disclaimer, the term of this patent is extended or adjusted under 35 U.S.C. 154(b) by 516 days.

(21) Appl. No.: 11/576,322

(22) PCT Filed: Oct. 5, 2004

(86) PCT No.: PCT/AU2004/001352

§ 371 (c)(1), (2), (4) Date: Mar. 29, 2007

(87) PCT Pub. No.: WO2006/037146

PCT Pub. Date: Apr. 13, 2006

(65) Prior Publication Data

US 2007/0249281 A1 Oct. 25, 2007

(51) Int. Cl.
*H04H 40/00* (2008.01)
(52) U.S. Cl. ............... 455/3.06; 455/414.4; 455/552.1; 455/466
(58) Field of Classification Search ............. 455/550.1, 455/3.01, 3.06, 3.02, 414.4, 418, 419, 517, 455/552.1, 556.1, 556.2, 566, 414.1, 466; 725/109, 81, 133, 141, 61, 87; 704/235
See application file for complete search history.

(56) References Cited

U.S. PATENT DOCUMENTS

| | | | |
|---|---|---|---|
| 2002/0101537 A1 | 8/2002 | Basson et al. | |
| 2002/0171760 A1 | 11/2002 | Dyer | |
| 2003/0014761 A1* | 1/2003 | Jun | 725/109 |
| 2006/0135198 A1* | 6/2006 | Lee | 455/550.1 |
| 2008/0294434 A1* | 11/2008 | Pettinato | 704/235 |

FOREIGN PATENT DOCUMENTS

| | | |
|---|---|---|
| EP | 1185142 A2 | 3/2002 |
| JP | 2004-185022 A | 7/2004 |
| WO | 02/089114 A1 | 11/2002 |
| WO | 03/061285 A2 | 7/2003 |
| WO | 03/090014 A2 | 10/2003 |
| WO | 04/1023805 A1 | 3/2004 |

OTHER PUBLICATIONS

International Preliminary Report dated Sep. 28, 2006.

* cited by examiner

*Primary Examiner*—John Lee
(74) *Attorney, Agent, or Firm*—Senniger Powers LLP

(57) ABSTRACT

A method and system for providing broadcast captions is disclosed which includes a tuner for receiving a broadcast signal, a decoder for stripping text data relating to the captions from the broadcast signal, and a transmission server for transmitting the captions to the device for display on the device. The device may be a mobile telephone (30) or a computer (40). The system and method may also provide images for display with the captions and may also present auxiliary captions in the form of advertisements for display when advertisements are being broadcast in the television broadcast and no captions are present. The data relating to the captions and images may be transmitted from the transmission server (20) by the Internet solely or by the Internet (22) and a wireless carrier (24).

23 Claims, 3 Drawing Sheets

METHOD AND SYSTEM FOR PROVIDING BROADCAST CAPTIONS

FIELD OF THE INVENTION

The present invention relates to a method and system for providing broadcast captions for display on a device.

BACKGROUND OF THE INVENTION

Many systems exist which provide audiovisual data and text data for consumption by consumers. Most systems require sophisticated television receivers or computers and display both the audiovisual data and text data to the consumer.

SUMMARY OF THE INVENTION

The object of the invention is to provide a system which provides an alternative so that broadcast captions can be displayed to a user.

The invention provides a system for providing broadcast captions to a remote display device, comprising:
  a receiver for receiving a broadcast signal containing audiovisual data, and text data which relates to the captions;
  a processor for removing the text data from the broadcast signal; and
  a communication link for transmitting the text data to the remote display device for display of the captions relating to the text data on the device.

Thus, the present invention removes the text data from the broadcast signal and supplies the text data to a remote device such as a mobile telephone, personal computer or the like so the captions can be viewed by a consumer without the audiovisual data relating to the broadcast.

In one embodiment of the invention the processor comprises a decoder for decoding and separating the text data from the broadcast signal and a transmission server for encoding the text data into a form suitable for transmission over the communication link and for receipt by the remote display device.

In one embodiment of the invention the display device is a mobile telephone.

In this embodiment the communication link may comprise the Internet and a wireless transmission system for transmitting an over-the-air signal containing the text data to the mobile telephone.

In another embodiment the remote display device comprises a personal computer.

In this embodiment the communication link may comprise only the Internet.

In one embodiment of the invention the text data is located in a vertical blanking interval of the broadcast signal and the decoder is a vertical blanking interval decoder for decoding the part of the broadcast signal in the vertical blanking interval into a plain text caption.

In other embodiments, the text data may be located in other parts of the broadcast signal or otherwise encoded into the broadcast signal and separated to provide captions for display.

In some embodiments of the invention the text data may also include data relating to colour, font type, size, highlighting and other parameters for displaying the captions relating to the text data on the remote device.

Preferably the transmission server encodes the text data into a digital format suitable for uploading to software contained in the remote display device which is intended to display the captions relating to the text data upon receipt by the remote display device.

In a still further embodiment of the invention the processor further comprises a broadcast program guide server for receiving program data relating to a program to which the broadcast signal relates and providing the program data to the transmission server for transmission with the text data to the remote display device so the remote display device displays the captions and also information relating to the program to which the captions relate.

In one embodiment of the invention the transmission server also transmits data relating to an image for display with the captions on the device.

In one embodiment the images comprise individual frames of the broadcast signal which are extracted from the broadcast signal.

In one embodiment the frames may be extracted by the VBI decoder.

In other embodiments they may be extracted by a separate extraction device.

In a still further embodiment the image may be supplied from a wallpaper database.

In a still further embodiment the processor is also for determining when an advertisement is being broadcast and for transmitting ancillary data to the device when the advertisement is being broadcast and no captions are being transmitted.

The ancillary data may comprise advertising data from a separate advertising database coupled to the processor.

The invention also provides a method of providing broadcast captions to a remote display device, comprising:
  receiving a broadcast signal containing audiovisual data, and text data relating to the captions;
  removing the text data from the broadcast signal; and
  transmitting the text data removed from the broadcast signal to the remote display device for display of the captions to which the text data relates on the device.

In one embodiment of the invention the display device is a mobile telephone.

In this embodiment the text data is transmitted over the Internet and a wireless transmission system to the mobile telephone.

In another embodiment the remote display device comprises a personal computer.

In this embodiment the text data is transmitted over only the Internet.

In one embodiment of the invention the text data is located in a vertical blanking interval of the broadcast signal.

In other embodiments, the text data may be located in other parts of the broadcast signal.

In some embodiments of the invention the text data may also include data relating to colour, font type, size, highlighting and other parameters for displaying the captions relating to the text data on the remote device.

Preferably the text data is encoded into a digital format suitable for uploading to software contained in the remote display device which is intended to display the captions.

In a still further embodiment of the invention the method further comprises providing program data relating to a program to which the broadcast signal relates and transmitting the program data with the text data to the remote display device so the remote display device displays the captions to which the text data relates and also information relating to the program to which the text data relates.

In one embodiment of the invention the method also transmits data relating to an image for display with the captions on the device.

In one embodiment the images comprise individual frames of the broadcast signal which are extracted from the broadcast signal.

In one embodiment the frames may be extracted by the VBI decoder.

In other embodiments they may be extracted by a separate extraction device.

In a still further embodiment the image may be supplied from a wallpaper database.

In a still further embodiment the method determines when an advertisement is being broadcast and transmits ancillary data to the device when the advertisement is being broadcast and no captions are being transmitted.

The ancillary data may comprise advertising data.

BRIEF DESCRIPTION OF THE DRAWINGS

Preferred embodiments of the invention will be described, by way of example, with reference to the accompanying drawings in which.

DETAILED DESCRIPTION OF THE PREFERRED EMBODIMENTS

Figure 1:
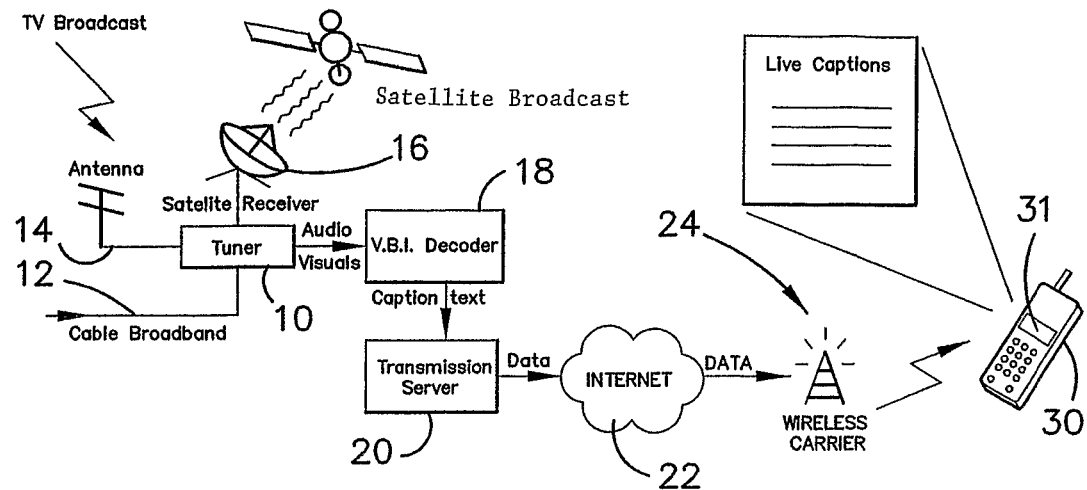
FIG. 1 is a diagram illustrating a first embodiment of the invention.

With reference to FIG. 1, a system for displaying captions on a device is shown. The system comprises a receiver preferably in the form of a tuner 10 which can be tuned to a particular frequency or digital channel, etc. for receiving a broadcast signal from a television station, outside live broadcast venue, or the like. The broadcast signal may be received by way of cable 12, over-the-air broadcast to antenna 14 or via satellite to a satellite dish 16.

The tuner which is tuned to a particular frequency or channel receives the broadcast signal and supplies the broadcast signal to a vertical blanking interval (VBI) decoder 18.

As is well known, captions are often provided for display as text on a TV screen, together with the audiovisual broadcast to assist hearing impaired people. In most instances, the text data relating to the captions is inserted into the vertical blanking interval of the broadcast signal. However, the data could be encoded in the signal in other ways. In the case of live broadcasts, such as sports events and the like, the data can be supplied by way of being typed into a processor for adding into the TV signal as the event being broadcast occurs. For example, a sports commentary will be heard by transcribing personnel who will type the transcript of the commentary provided by the commentators of the event to thereby provide the captions. The typed information is transmitted as text data so that that data can be received and displayed as captions on the TV screen with the other audiovisual information. Typically, TVs for the hearing impaired are provided with encoders which display the captions together with the audiovisual information so the captions can be read by the person rather than the person having to rely on hearing the broadcast through the speakers of the television.

In the present invention, the VBI decoder 18 separates the text data from the broadcast signal and supplies the text data to transmission server 20. The transmission server 20 encodes the text data received from the decoder 18 into a digital format suitable for uploading to software contained in a remote display device belonging to a user so the user will be able to display the captions relating to the text data so the captions can then be read by the user.

The transmission server 20, in the first embodiment of the invention, transmits the text data in real time over the Internet 22 to a wireless carrier network 24 which then transmits the signal as an over-the-air telephone signal or data message signal to a mobile telephone 30 belonging to a user. Thus, the mobile telephone can receive the text data and display the captions corresponding to the text data on display 31 of the mobile telephone 30 so that the text data can be read by the user. Thus, the commentary of a sporting event, television program or other broadcast, such as a news program or the like can be read by the user from the display on the mobile telephone without seeing or hearing the audiovisual component of the broadcast.

The software in the mobile telephone 30 formats the data received from the transmission server 20 into colour, spacing and the like for suitable display on the screen 31. When new text captions are received, the old text captions are either removed or shifted off-screen to allow space for the new caption text data.

Figure 2:
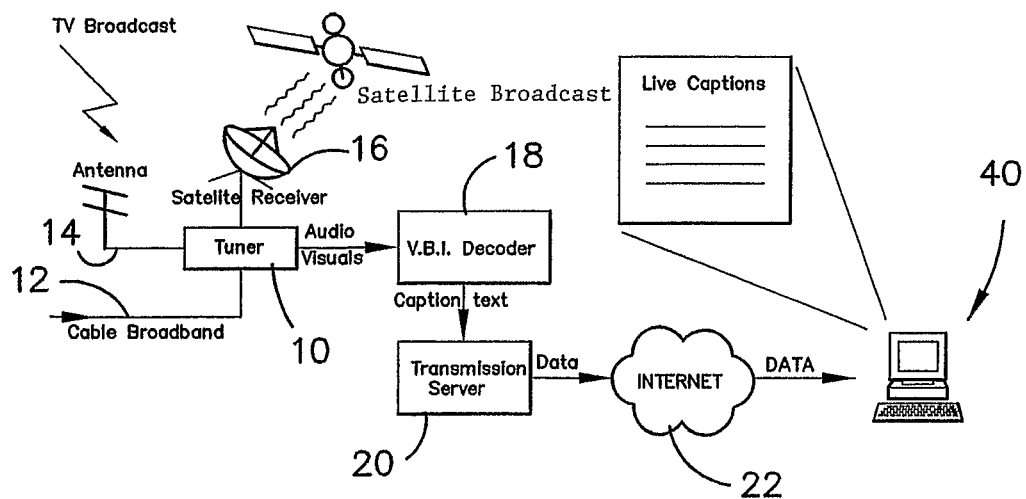
FIG. 2 shows a second embodiment of the invention.

FIG. 2 shows a second embodiment of the invention which is the same as the embodiment of FIG. 1 except that the remote device is a personal computer 40. In this embodiment, like reference numerals indicate like parts to those previously described. As noted in this embodiment, the transmission server 20 connects direct to the personal computer 40 by the Internet 22 and a wireless carrier network is not utilised.

Figure 3:
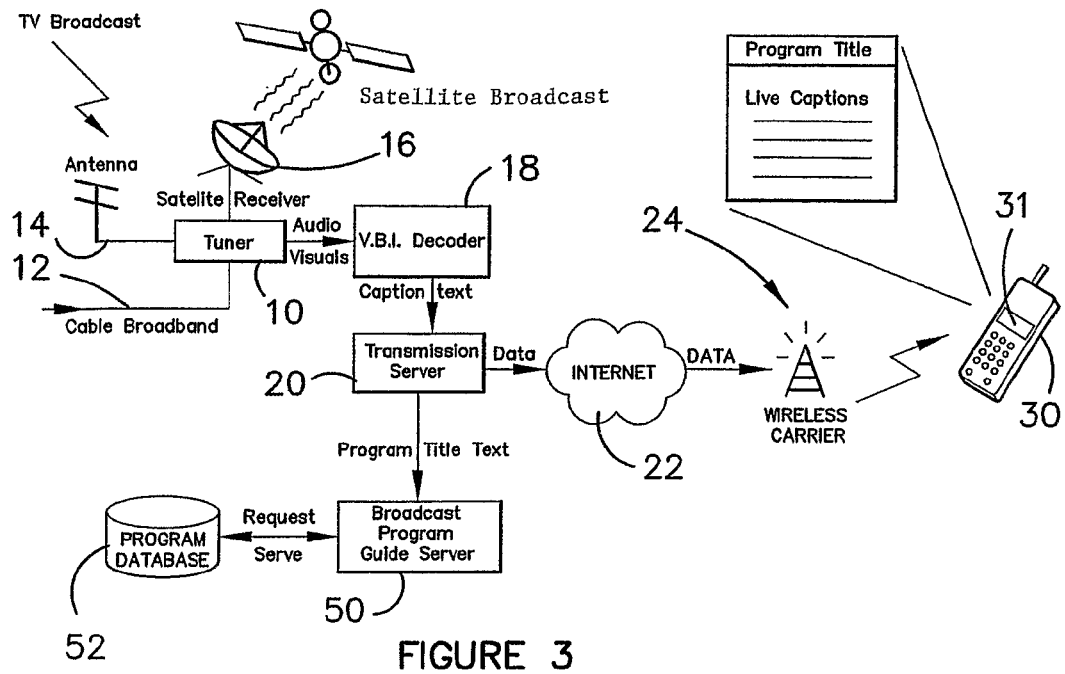
FIG. 3 shows a third embodiment of the invention.

FIG. 3 shows a still further embodiment of the invention which is the same as the embodiment of FIG. 1 where like reference numerals again indicate like parts to those previously described. In the embodiment of FIG. 3, a broadcast program guide server 50 is provided and which is connected to the transmission server 20. The server 50 receives data from a program database 52 or from another source which relates to the program which is being broadcast and which is received by the VBI decoder 18. The server 50 contains routines to receive the appropriate show title to which the text data transmitted by the server 20 relate, so that information relating to the program can also be forwarded to the device 30 for display on the display 31. The title of the program to which the text data relates may be displayed on the display 31 in a particular location and is removed and replaced automatically with a new program title when the program broadcast changes.

In other embodiments the data which relates to the program which is being broadcast may be provided from a source other than a database (such as the database 52). The program data may be provided with the text data to which the caption relates. In this regard, for analogue and digital television broadcasts, the program show information and channel identification are often encoded in the same vertical blanking interval area that the captions are. This data is called XDS (previously known as EDS) and stands for Extended Data Services. The data may include information as to the time of the day, station network, name of the current program, etc. Thus, that information may also be stripped from the broadcast signal by the decoder 18 in the embodiment of FIG. 3 (and also in the embodiment of FIG. 4 to be described hereinafter).

Figure 4:
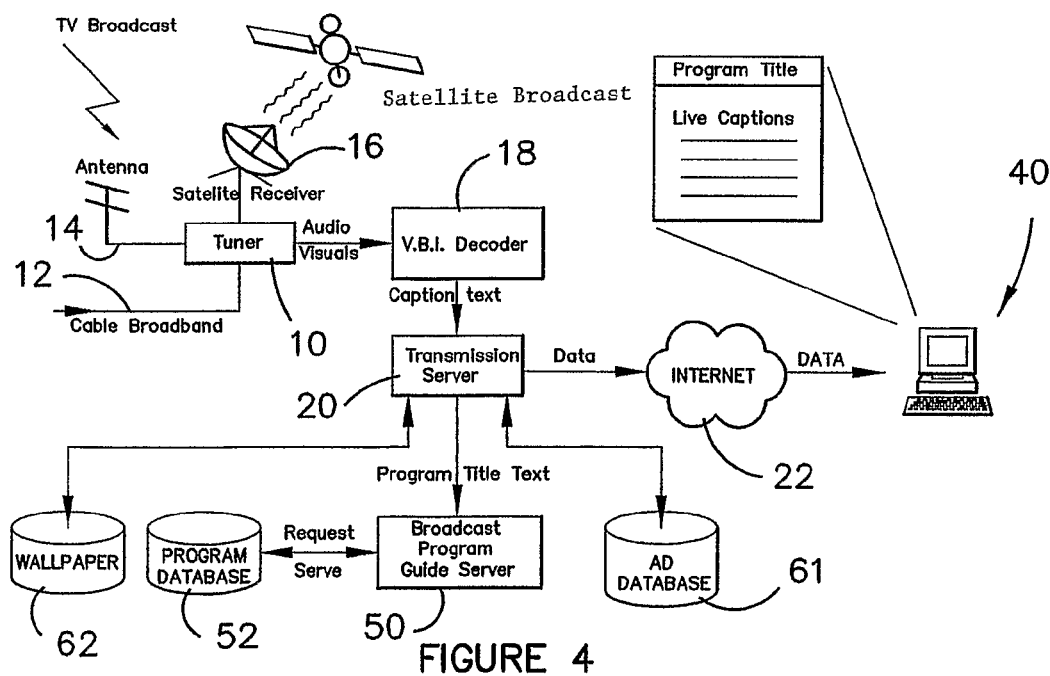
FIG. 4 shows a fourth embodiment of the invention.

FIG. 4 is a further embodiment which is the same as that in FIG. 3, but relates to the use of a personal computer, as per the embodiment of FIG. 2. Once again, like reference numerals indicate like parts to those previously described. This embodiment operates in the same manner as described with reference to FIGS. 2 and 3.

In the embodiment of FIG. 4, the transmission server or some other device may identify when advertisements are being broadcast so that the advertisements which are being broadcast so that the time allocated to the broadcast can be filled with additional advertisements which are provided from an advertisement database 61. The advertisement database 61 contains advertisements and when the transmission server identifies that an advertisement is being broadcast, the transmission server will insert the text relating to the advertisement which is desired to be displayed from the database 61 into the data which is forwarded via the Internet 22 to the computer 40 so that particular advertisement is displayed as captions rather than the advertisement which is being broadcast by the television broadcast received by the tuner 10. When the advertisement which is being broadcast in the television broadcast ceases, the transmission server 20 detects this and ceases supply of the captions relating to the advertisement from the database 61 and recommences provision of captions contained in the telephone broadcast relating to the program in question.

In a still further modification to the embodiment of FIG. 4, an image can also be supplied from the transmission server 20 for display on the computer 40. The image may contain a frame of the actual television broadcast which is displayed for a predetermined time and then updated with a new image. For example, a particular frame of the broadcast could be displayed for a period of 10 seconds and then replaced by another frame and so on, to provide a background to the captions or an image above or below the captions which also provide some indication of the nature of the television broadcast to which the captions relate. Typically, the timing between update of images could be in the order of 10 seconds so that the images are very much static images and not a streaming video presentation.

In one embodiment, the images may be provided by the VBI decoder 18 having additional suitable software from the broadcast signal received by the tuner 10. However, in a more preferred embodiment, the image could be extracted from the broadcast by a separate device or the image may be provided by a wallpaper database 62. The wallpaper database may container various wallpapers which relate to particular types of programs such as sports events, news programs, etc. so that a wallpaper of a particular image which has some relation to the program in question is extracted from the database 62 and supplied by the transmission server with the text data relating to the captions for display on the computer 40. Thus, once again, an image background can be displayed. The databases 61 and 62 could also be used in the embodiments of FIGS. 1 to 3 to supply advertisements during the time that advertisements are being broadcast by the television broadcast and in which no caption information is provided, and also for the display of an image from the broadcast signal or from a wallpaper database 62 in the same manner as described above.

In order to display the captions and other image material on the computer 40 or the mobile telephone 30, application software is loaded into the phone 30 or the computer 40. The software may be provided with the telephone 30 or the computer 40 or may be downloaded via the Internet or any other communication link in any conventional way.

Figure 5:
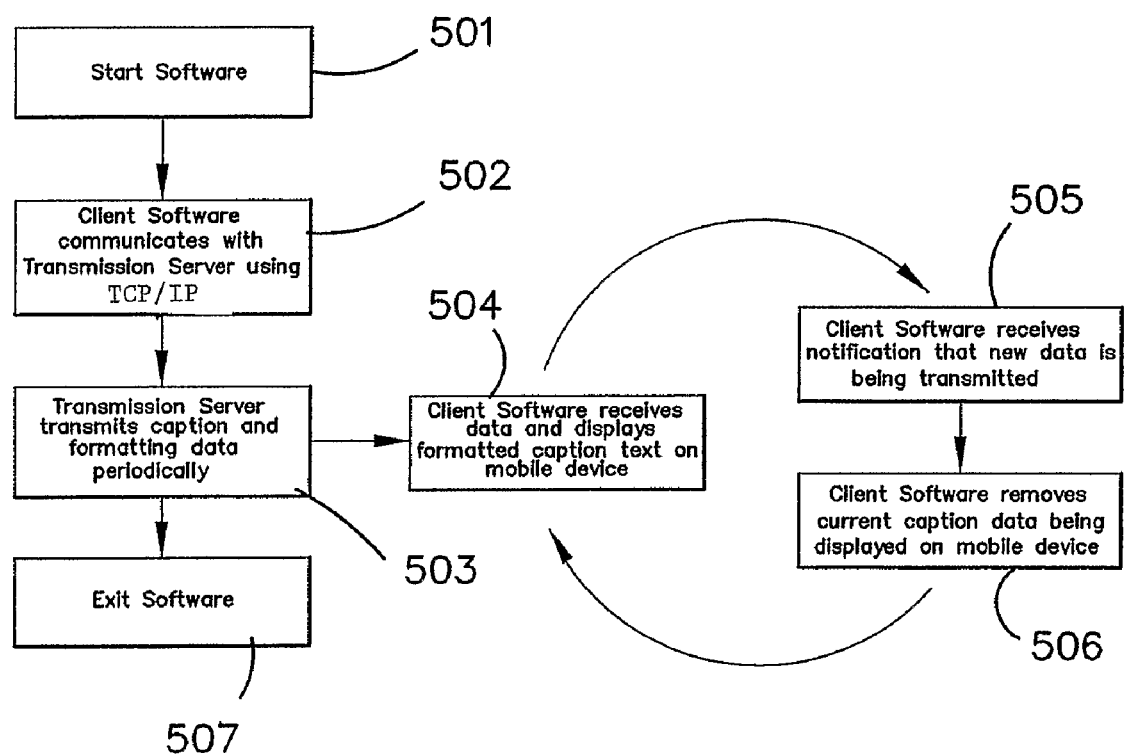
FIG. 5 is a flowchart showing how captions are displayed.

When a user wishes to display the captions on his or her mobile telephone or computer, the user will scroll down an inbuilt menu system and select the caption application. This therefore starts the application as per step 501 of FIG. 5. For ease of explanation, the following discussion will merely refer to the mobile telephone 30 but the embodiments in which the computer 40 are used operate in the same way.

The in-built software communicates using TCP/IP, or a similar network protocol connection, over a wireless carrier's packet-switched/circuit-switched network in the case of a mobile device, to the transmission server as per step 502. The transmission server may be local to the wireless carrier and available via a Local Area Network or similar, or more likely communicated with over the Internet.

There are a variety of languages used today for mobile software, with the two most common being the proprietary J2ME, a subset of Sun Microsystem's Java language and Brew, a language owned and distributed by Qualcomm Inc. However, assembly language may also be used among many others for the creation of the client software.

The Internet Protocol (IP) is the standard method for transporting data between computers on the Internet. IP encodes data in the form of packets, a linear sequence of bytes of a known length. Each packet contains a header section at the beginning that includes the addresses of the source and destination computer, as well as error detection data. There may be other network protocols that are more suitable, however it is envisioned that TCP/IP would be most likely used as the protocol of communication between the transmission server and client software.

The transmission server will deliver program-specific data to the software, using TCP/IP, immediately after a sequence of captions has been decoded from a television broadcast. The transmission server will send small segments of captions as program-specific data, using the TCP/IP protocols, to the client software, matching the pace of caption data as per step 503 decoded from the initial broadcast. The method of decoding captions, sending data, receiving data, displaying data is done in such a way as to require as minimal storage as possible by the software on the mobile device. This enables the software to use less memory as all caption data, after it has been displayed to the end-user for a set-time or a set number of caption sequences have been received, is removed from the client software's memory.

On receipt of the program-specific data, the software displays the caption text embedded in this data on the mobile device's display (as per step 504) with color and formatting as specified in the data received. Hence, if the transmission server allocated yellow=true, bold=true, inside the transmitted data, then the software would understand these commands and display the embedded caption text accordingly on the mobile device and, in this particular example, the text would be a yellow color with a bold typeface.

The caption data may be encrypted or compressed to limit the data transferred between the transmission server and software.

When new caption data is sent (as per step 505) from the transmission server, the software will either remove totally, shift in a direction to create space, or shift off-screen, the last caption displayed and render the new caption on the screen (as per step 506). To an end-user of the client software, this will be done in a way to allow the user to follow a conversation or flow of a television program.

Steps 504, 505 and 506 continue to display the captions which are stripped from the broadcast signal by the decoder 18 until such time as the program finishes or the user exits the application as identified by step 507.

Since modifications within the spirit and scope of the invention may readily be effected by persons skilled within the art, it is to be understood that this invention is not limited to the particular embodiment described by way of example hereinabove.

In the claims which follow and in the preceding description of the invention, except where the context requires otherwise due to express language or necessary implication, the word "comprise", or variations such as "comprises" or "comprising", is used in an inclusive sense, ie. to specify the presence of the stated features but not to preclude the presence or addition of further features in various embodiments of the invention.

The invention claimed is:

1. A system for providing broadcast captions to a mobile telephone, comprising:
   a receiver for receiving a broadcast signal containing audiovisual data, and text data which relates to the captions;
   a processor for removing the text data from the broadcast signal and providing at least one frame containing visual information relating to the broadcast signal;
   a transmitter for supplying the text data and the frame; and
   a communication link for receiving the text data and frame and for transmitting the text data and frame to the mobile telephone for display of the captions relating to the text data on the mobile telephone, and for concurrently displaying the frame as wallpaper with the text data on the mobile telephone.

2. The system of claim 1 wherein the processor comprises a decoder for decoding and separating the text data from the broadcast signal and a transmission server for encoding the text data into a form suitable for transmission over the communication link and for receipt by the mobile telephone.

3. The system of claim 2 wherein the transmission server encodes the text data into a digital format suitable for uploading to software contained in the mobile telephone which is intended to display the captions relating to the text data upon receipt by the mobile telephone.

4. The system of claim 2 wherein the decoder and the transmission server are implemented on common processor hardware.

5. The system of claim 1 wherein the communication link may comprise the Internet and a wireless transmission system for transmitting an over-the-air signal containing the text data to the mobile telephone.

6. The system of claim 1 wherein the text data is removed from a vertical blanking interval of the broadcast signal and the decoder is a vertical blanking interval decoder for decoding the part of the broadcast signal in the vertical blanking interval into a plain text caption.

7. The system of claim 1 wherein the text data includes data relating to color, font type, size, highlighting and other parameters for displaying the captions relating to the text data on the mobile telephone.

8. The system of claim 1 wherein the processor further comprises a broadcast program guide server for receiving program data relating to a program to which the broadcast signal relates and providing the program data to the transmission server for transmission with the text data to the mobile telephone so the mobile telephone displays the captions and also information relating to the program to which the captions relate.

9. The system of claim 1 wherein the visual information for the frame or frames is supplied from a wallpaper database.

10. The system of claim 1 wherein the processor is also for determining when an advertisement is being broadcast and for transmitting ancillary data to the mobile telephone when the advertisement is being broadcast and no captions are being transmitted.

11. The system of claim 10 wherein the ancillary data comprises advertising data from a separate advertising database coupled to the processor.

12. The system of claim 1 wherein the at least one frame containing visual information is at least one individual frame of the broadcast signal which is extracted from the broadcast signal.

13. The system of claim 12 wherein the frames are extracted by the decoder.

14. A method of providing broadcast captions to a mobile telephone, comprising:
   receiving a broadcast signal containing audiovisual data, and text data relating to the captions;
   removing the text data from the broadcast signal;
   transmitting the text data removed from the broadcast signal to the mobile telephone for display of the captions to which the text data relates on the mobile telephone; and
   transmitting at least one frame relating to visual information in the broadcast signal for display as wallpaper concurrently with the captions on the mobile telephone.

15. The method of claim 14 wherein the text data and frame are transmitted over the Internet and a wireless transmission system to the mobile telephone.

16. The method of claim 14 wherein the text data is in removed from a vertical blanking interval of the broadcast signal.

17. The method of claim 14 wherein the text data also includes data relating to color, font type, size, highlighting and other parameters for displaying the captions relating to the text data on the mobile telephone.

18. The method of claim 14 wherein the text data is encoded into a digital format suitable for uploading to software contained in the mobile telephone which is intended to display the captions.

19. The method of claim 14 wherein the method further comprises providing program data relating to a program to which the broadcast signal relates and transmitting the program data with the text data to the mobile telephone so the mobile telephone displays the captions to which the text data relates and also information relating to the program to which the text data relates.

20. The method of claim 14 wherein the at least one frame relating to visual information is one or more frames of the broadcast signal extracted by a vertical blanking interval decoder.

21. The method of claim 14 wherein the visual information is supplied from a wallpaper database.

22. The method of claim 14 wherein the method further comprises the steps of:
   determining when an advertisement is being broadcast; and
   transmitting ancillary data to the mobile telephone when the advertisement is being broadcast and no captions are being transmitted.

23. The method of claim 22 wherein the ancillary data comprises advertising data.

* * * * *